(No Model.)
J. P. CULVER.
TREE COVER AND FUMIGATOR.
No. 367,134. Patented July 26, 1887.
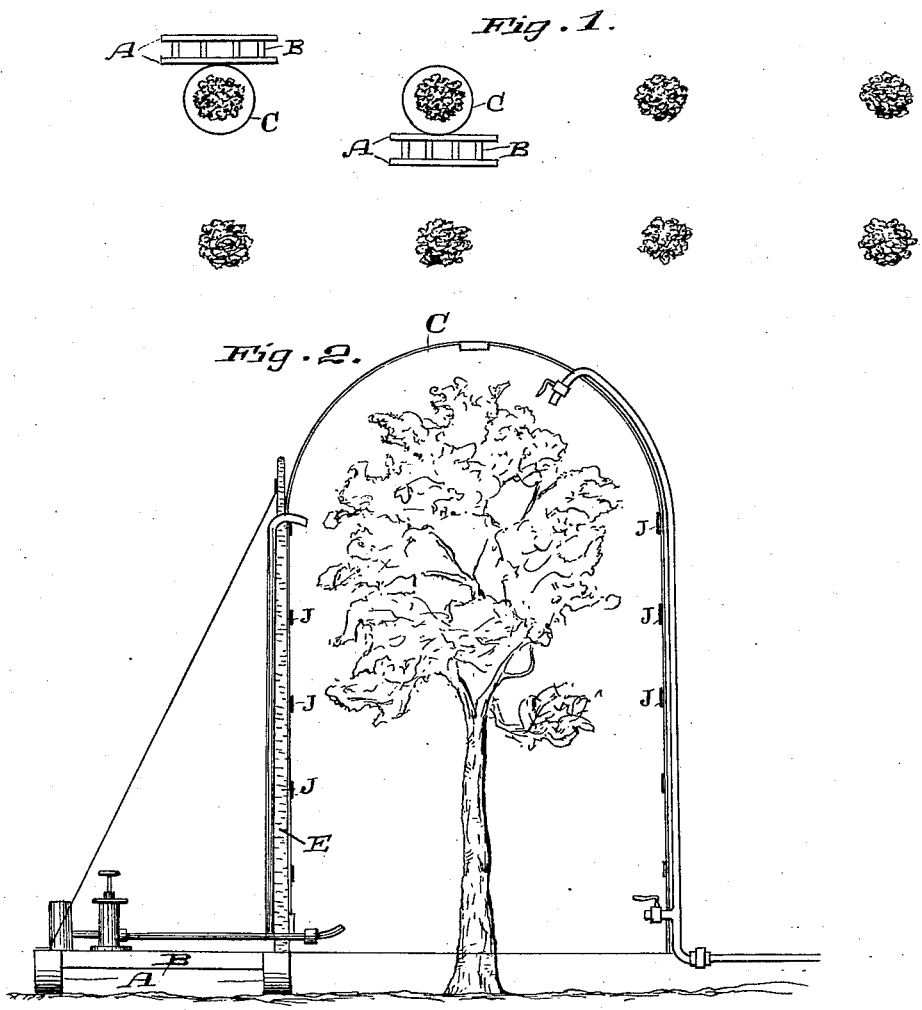
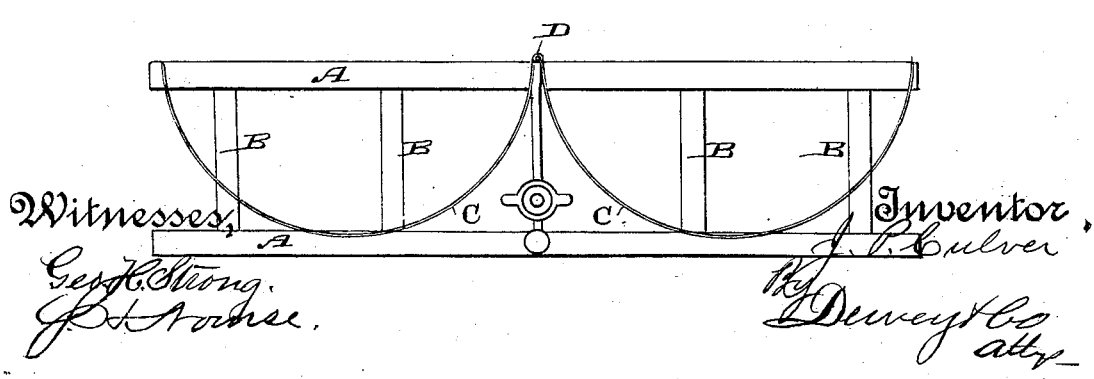
Witnesses,
Geo. H. Strong.
J. H. Morse.
Inventor,
J. P. Culver
By Dewey & Co
Attys

UNITED STATES PATENT OFFICE.

JOHN P. CULVER, OF LOS ANGELES, CALIFORNIA.

TREE COVER AND FUMIGATOR.

SPECIFICATION forming part of Letters Patent No. 367,134, dated July 26, 1887.

Application filed May 11, 1887. Serial No. 237,904. (No model.)

*To all whom it may concern:*

Be it known that I, JOHN P. CULVER, of Los Angeles, Los Angeles county, State of California, have invented an Improvement in Tree Covers and Fumigators; and I hereby declare the following to be a full, clear, and exact description of the same.

My invention relates to a device for clearing trees from scale and other noxious insects; and it consists of one or more peculiarly-constructed covers, which may be fitted over the trees to be treated, said covers also being connected in series, so that one or more of the trees may be treated at one time.

Referring to the accompanying drawings for a more complete explanation of my invention, Figure 1 is a general view of my apparatus. Fig. 2 is a view of one of the covers in place over the tree. Fig. 3 shows the cover removed and lying down upon the sled or carrier.

In the case of orange and other citrus trees which are afflicted with the scale insect, or any trees which are infested with noxious insects, it is desirable to subject them to a treatment which will clear them of the vermin, not only the leaves and branches, but also the trunks and the ground around the trees. In order to do this various inclosing-tents have been employed, and my invention is an improvement upon these devices, whereby the tents or covers are easily applied to any tree or removed therefrom and transported from tree to tree, and a means for uniting or connecting two or more of the tents or covers in a series, so that when the apparatus is once set a number of trees may be treated at one time.

A is a sort of sled, composed of runners turned up at either end, so as to be easily drawn along upon the ground, these runners being united by cross-bars B, as shown. The sled is made narrow enough to pass between the rows of trees or vines to be treated and supports a tent or cover, C, by which the tree is to be inclosed. I have shown the cover made in two vertical halves hinged together at D, and having a suitable supporting post or standard, E, which is fixed upon or near one side of the sled, so that when the cover is opened about its hinges it forms two half-cylinders, the open sides of which are near one side of the sled, while the rounded or circular sides extend back to the opposite side. This reduces the diameter of the cover, so that it will easily pass between the rows without folding, which would soon crack the cover and make it leak, and when the sled is opposite a tree the cover may simply be closed about the tree by turning the two parts about their hinges, and any suitable fastening will hold them together. The lower edges may be made tight and close upon the surface of the ground around the tree, or may have an independent bottom, or be otherwise closed.

The tents or covers may be made in various ways. In the present case I have shown them made of light cloth, canvas, or other flexible material varnished or coated, so as to be gastight, having hoops J, extending around them horizontally at intervals, and also having the top distended by hoops or cross-pieces in the same manner.

The apparatus for producing noxious and preferably heavy gases is then connected with the tent and the gas allowed to flow into it until it is filled and the whole of the foliage and branches and trunk of the tree and the ground beneath thoroughly permeated with the gases.

In order to make the operation more rapid and less expensive, I employ a number of these tents or covers, which are applied to several trees in a row, and these covers are then connected by pipes K, so that when the first cover is full the gas will flow through the pipes and fill the second, thence to the third, and so on until the entire series have been filled. If necessary, supplemental pipes may be introduced into the covers which are most distant from the apparatus producing the gas, so as to keep up its quality. After one series has thus been treated the apparatus may be removed to another series, and so on until as many trees have been acted upon as may be desired.

The gas may be transmitted from tree to tree by connecting the last cover with a suction fan or pump, so that a partial vacuum is produced, and the gas withdrawn from the last cover may be reintroduced into the first, thus saving expense.

As soon as the first tree is completed the cover is removed and transferred to the one beyond the last, and connected so that the work becomes continuous.

Having thus described my invention, what I claim as new, and desire to secure by Letters Patent, is—

1. An apparatus for fumigating or applying vapors to trees, consisting of a vertically-separable tent or cover inclosing said trees and covering the ground around them, and a tube or pipe connected with said tent and with an apparatus for producing vapors, substantially as herein described.

2. The combination, with a sled having a vertical post, E, of a vertically-separable tent or cover suspended from said post and closed about vertical hinges on the same, substantially as described.

3. The posts or uprights mounted upon a vehicle or runners, so as to be transported from place to place, and tents or covers vertically divided and hinged to the uprights, so as to be opened or closed about trees or shrubs, substantially as herein described.

4. The vertically-divided tent or cover consisting of canvas or flexible material having the horizontal distending hoops and the transverse hoops at the top, in combination with the vertical side post, to which the uniting edges of one side of the cover are hinged, so that the tent may be opened or closed, substantially as herein described.

5. A tent or cover inclosing a tree or shrub, and a pipe connected therewith and with an apparatus for discharging vapors, in combination with a suction fan or pump connecting with the cover, whereby the vapors or gases may be made to circulate through the same, substantially as described.

In witness whereof I have hereunto set my hand.

JOHN P. CULVER.

Witnesses:
M. DODSWORTH,
F. M. KEACH.